US012596965B2

(12) United States Patent
Schulz et al.

(10) Patent No.: US 12,596,965 B2
(45) Date of Patent: Apr. 7, 2026

(54) CROSS-MODEL FORMAT COMPARISON

(71) Applicant: HiddenLayer, Inc., Austin, TX (US)

(72) Inventors: Kasimir Ralph Peter Schulz, Raleigh, NC (US); David Beveridge, Vancouver, WA (US)

(73) Assignee: HiddenLayer, Inc., Austin, TX (US)

( * ) Notice: Subject to any disclaimer, the term of this patent is extended or adjusted under 35 U.S.C. 154(b) by 209 days.

(21) Appl. No.: 18/770,545

(22) Filed: Jul. 11, 2024

(65) Prior Publication Data

US 2026/0017570 A1     Jan. 15, 2026

(51) Int. Cl.
G06N 20/20          (2019.01)

(52) U.S. Cl.
CPC .................................... G06N 20/20 (2019.01)

(58) Field of Classification Search
CPC ...................................................... G06N 20/20
USPC ........................................................... 706/12
See application file for complete search history.

(56) References Cited

U.S. PATENT DOCUMENTS

| | | | |
|---|---|---|---|
| 11,347,845 | B2 | 5/2022 | Kursun |
| 11,361,100 | B1 | 6/2022 | Gates |
| 11,501,108 | B2 | 11/2022 | Michiels |
| 11,514,365 | B2 | 11/2022 | Cheruvu |
| 11,704,677 | B2 | 7/2023 | Savir |
| 11,797,672 | B1 | 10/2023 | Beveridge et al. |
| 11,921,903 | B1 | 3/2024 | Beveridge et al. |

| | | | |
|---|---|---|---|
| 2012/0210423 | A1 | 8/2012 | Friedrichs et al. |
| 2015/0180890 | A1 | 6/2015 | Ronen et al. |
| 2020/0110993 | A1 | 4/2020 | Liu et al. |
| 2020/0380123 | A1 | 12/2020 | Reimann et al. |
| 2021/0019605 | A1 | 1/2021 | Rouhani et al. |
| 2021/0157912 | A1 | 5/2021 | Kruthiveti et al. |
| 2022/0156368 | A1 | 5/2022 | Spyridopoulos et al. |
| 2022/0398311 | A1 | 12/2022 | Young et al. |
| 2023/0185906 | A1 | 6/2023 | Paranjape et al. |
| 2023/0185912 | A1 | 6/2023 | Sinn et al. |
| 2023/0222385 | A1 | 7/2023 | Shimizu et al. |
| 2023/0237552 | A1* | 7/2023 | Arrabothu .......... G06Q 30/0641 705/26.7 |

OTHER PUBLICATIONS

Csiszarik, et al., "Similarity and Matching of Neural Network Representations", 35th Conference on Neural Information Processing Systems (NeuIPS 2021), 2021 (Year: 2021).*

* cited by examiner

*Primary Examiner* — Tsu-Chang Lee
(74) *Attorney, Agent, or Firm* — Jones Day

(57) ABSTRACT

A machine learning model representation is obtained from a model source and information characterizing the layers of the model representation is extracted to result in extracted model information. This extracted model information can be compared to information characterizing one or more known (i.e., previously characterized) machine learning models in order to determine whether there is a match based on layer information. A match can, in some cases, be used to determine an identity of the underlying machine learning model for the model representation. Information regarding the comparison (i.e., the model matching determination) can be provided to a consuming application or process. Related apparatus, systems, techniques and articles are also described.

25 Claims, 3 Drawing Sheets

*200*

MODEL SOURCE
210

MODEL REPRESENTATION
220

EXTRACT MODEL INFORMATION
230

DETERMINE WHETHER MODEL MATCHES KNOWN MODEL(S) BASED ON EXTRACTED MODEL INFORMATION
240

CONSUMING APPLICATION / PROCESS
250

CROSS-MODEL FORMAT COMPARISON

TECHNICAL FIELD

The subject matter described herein relates to techniques for determining whether files encapsulating machine learning models represent a same or different machine learning model.

BACKGROUND

Machine learning models represent vast computations across a given dataset, which has been trained, tweaked, and tuned to perform a specific task or put to a more general application. Before a model can be deployed in a product or used as part of a service, it must be serialized (e.g., saved) in what is referred to as a serialization format. By effectively boiling a model down into a binary representation, one can deploy the model outside the system it was trained on or share it with third parties. A same model can be represented in different ways across different frameworks (i.e., different binary representations, etc.) which can sometimes be difficult to distinguish given the proliferation of pre-trained and open-source models.

As more model formats are created, one issue that comes up more frequently is comparing two models of different formats or different file conventions to ensure that they are the same model. Unlike code, where it is easy to tell if one file is equal to another, models cannot be easily compared because specific components need to be checked. These components can be wrapped with other data that changes format to format or file to file, and the tensor weights may be stored differently from format to format as well. This means that simple comparisons like hash comparisons on the file or tensors themselves will not succeed.

The inability to successfully compare two model formats to see if they are storing the same model is a scenario that users often need to face. While most frameworks can accept multiple different formats, there are many frameworks that will only accept specific formats. This also becomes an issue when the model itself does not need to change but when a model format and a framework are upgraded and the model needs to be converted, for example GGML to GGUF files. There are also new file formats such as safetensors which revolve around security, however, converting insecure model formats to a more secure model format is not without risks and can be hijacked resulting in a secure model format with modified tensor weights.

SUMMARY

In a first aspect, first data (e.g., a first file, etc.) is received which characterizes a first machine learning model. First information is extracted from the first data which characterizes weight layers from the first machine learning model including a number of layers and identifiers of such layers. In addition, second data (e.g., a second file, etc.) is received which characterizes a second machine learning model. Second information is extracted from the second data which characterizes weight layers from the second machine learning model including a number of layers and identifiers of such layers. A determination can be then made by comparing the extracted first information to the extracted second information as whether the first machine learning model is a same model as the second machine learning model if the respective number of layers and the identifiers of the layers match. Data indicating whether the first machine learning model is the same or different as the second machine learning model is provided to a consuming application or process.

In some variations, a format of the first machine learning model is different than a format of the second machine learning model while in other variations the formats are the same. Further, the received first data and the received second data can include metadata which does not form part of the respective extracted information.

A format of the first machine learning model can be detected. This detected format can be used to specify which features to extract from the first data to constitute the extracted first information. Similarly, a format of the second machine learning model can be detected. This detected format can be used to specify which features to extract from the second data to constitute the extracted second information.

The extracted first information can include weights for each of the layers of the first machine learning model and the extracted second information can include weights for each of the layers of the second machine learning model. The determination, in these variations, can include comparing the weights for layers having a same identifier to determine whether they match.

In some cases, the weights can be reordered in a deterministic manner prior to the comparing (i.e., to make the process more computationally efficient, etc.).

The second first information can include biases for each of the layers of the first machine learning model and the extracted second information can include biases for each of the layers of the second machine learning model. The determination, in these variations, can include comparing the biases for layers having a same identifier to determine whether they match.

In an interrelated aspect, first data is received which characterizes a first machine learning model. First information is extracted from the first data which characterizes weight layers from the first machine learning model including a number of layers, identifiers of the layers, weight values for the layers, and bias values for the layers. Second data is received which characterizes a second machine learning model which is of a different format and/or has different metadata than the first machine learning model. Second information is extracted from the second data which characterizes weight layers from the second machine learning model including a number of layers, identifiers of the layers, weight values for the layers, and bias values for the layers. First, the number of layers from the extracted first information can be compared to the number of layers from the extracted second information to detect a match. Second, if a match is detected in the first comparison, the identifiers of the layers from the extracted first information can be compared to the identifiers from the extracted second information to detect a match. Third, if a match is detected in the second comparison, the weight values from the extracted first information is compared to the weight values from the extracted second information to detect a match. Fourth, if a match is detected in the third comparison, the bias values from the extracted first information are compared to the bias values from the extracted second information to detect a match. It is determined that the first machine learning model is a same model as the second machine learning model if each of the first comparing, the second comparing, the third comparing, and fourth comparing detect a match. It is determined that the first machine learning model is not a same model as the second machine learning model if one of the first comparing, the second comparing, the third comparing, and the fourth comparing do not detect a match. Data indicating whether the first machine learning model and the second machine learning model are the same or different is provided to a consuming application or process.

The first comparing, the second comparing, the third comparing, and the fourth comparing can be sequentially performed on a layer-by-layer basis until the earlier of (i) all layers being analyzed or (ii) a match is not detected for one of the layers.

In further interrelated aspect, first data is received that characterizes a machine learning model. First information is extracted from the first data which characterizes weight layers from the first machine learning model including, for example, a number of layers, identifiers of layers, weights, and/or biases). A determination is made as whether the first machine learning model is the same or different from a second machine learning model by comparing the extracted first information to second information characterizing the second machine learning model. The determining can be based on whether the respective number of layers, the identifiers of the layers, the weights of the layers, and/or the biases of the layers, from the extracted first information match the second information. Data indicating whether the first machine learning model is the same or different than the second machine learning model can be provided to a consuming application or process.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for confirming an identity or provenance of a machine learning model. Such confirmations can be useful, for example, in ensuring that an accessed machine learning model will behave in a desired manner.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to a system that takes two or more files encapsulating machine learning models and checks whether or not the two or more files represent the same machine learning model. The analysis can commence by extracting the weight layers from the model files. Once the layers have been extracted, the number of layers and the names of such layers can be checked to determine if they match (at the same time or in sequence). After the layer names have been verified, the layers with the same identifier are analyzed to check if the weights inside of the layer match between the two files. This is done by ensuring that the size of the weights are the same and/or the weights match between the two files. In some variations, the layers do not have associated names and so the name matching operation can be omitted. In some cases, model formats may not have names for layers but the ordering of the layers would still indicate which layer it is supposed to be which can be matched against a named layer. For example, File 1 has named layers A, B, C and file 2 has 2 unnamed layers but the ordering means that the first layer should be A, the second layer should be B, and the third layer should be C.

Figure 1:
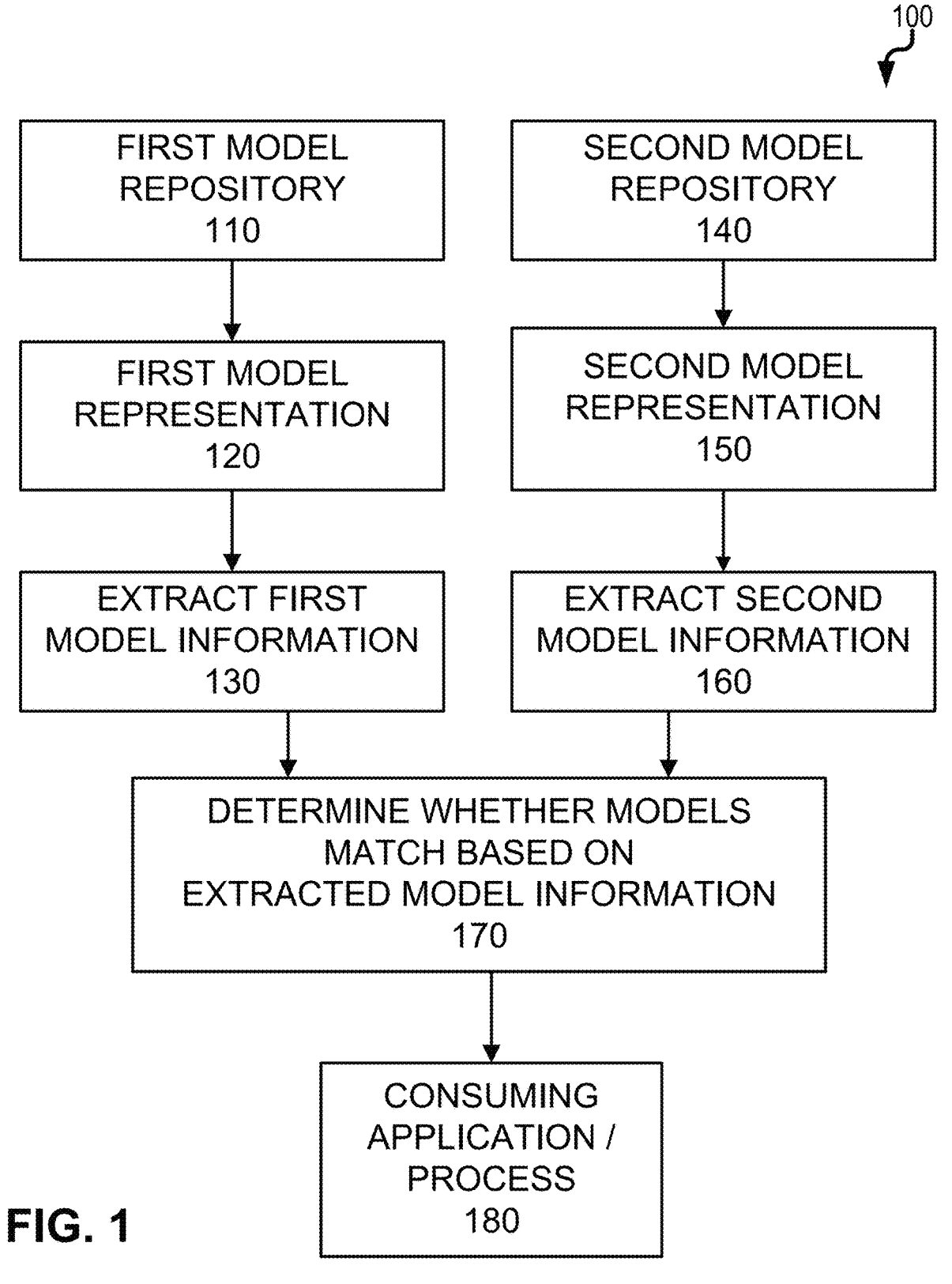
FIG. 1 is a process flow diagram illustrating a first cross-model comparison workflow.

FIG. 1 is a sample workflow 100 in which a first machine learning model repository 110 is accessed in order to obtain a first machine learning model representation 120 so that information characterizing the underlying machine learning model (i.e., first model representation information 130) can be extracted. A repository in this context, can refer to a cloud-based system storing representations of vast numbers of machine learning models. The workflow 100 can also include accessing a second machine learning model repository 130 in order to obtain a second machine learning model representation 150 so that information characterizing the underlying machine learning model (i.e., extracted second model information 150) can be extracted. In some cases, a file format for one of the first machine learning model representation 120 and/or the second machine learning model representation 150 can be detected (e.g., file extension, file structure, etc.) or otherwise determined (i.e., downloaded from a particular source/repository, etc.) and these formats can be used to drive which features to extract from the respective model representations 120, 150.

The first machine learning model representation 120 can have a different format than the second machine learning model representation 150. In some variations, the first machine learning model representation 120 and the second machine learning model representation 150 have a same format (i.e., same file type) but different metadata (which can be at the start of a file or attached to each layer prior to the weights, etc.) thus making the corresponding files different (which prevents a hash comparison). Example formats, in this context, can include, but are not limited to: one or more model representations such as GML, GGUF, SafeTensors, Pytorch, Keras, Tensorflow, CoreML, and the like.

Both of the first machine learning model representation 120 and the second machine learning model representation 150 can comprise machine learning models having multiple layers (e.g., neural networks, etc.). The extracted first model information 130 and the extracted second model information 160 can characterize different aspects of these layers. For example, the extracted model information 130, 160 can include a number of layers in each model representation 120, 150. The extracted model information 130, 160 can include identifiers (e.g., names) for each of the layers. Further, the extracted model information 130, 160 includes weights for each of the layers (an essential component for the model comparisons). Still further, the extracted model information 130, 160 can include biases (i.e., bias values) for each of the layers. In some cases, information relating to only a subset of the layers is extracted for computational efficiency. In some variations, the layer-by-layer comparison techniques are iterative and the process stops once a mismatch is detected. Further, in some variations, metadata within the corresponding first machine learning model representation 120 and metadata in the second machine learning model representation 150 need not be considered or otherwise compared (i.e., not extracted, etc.). The metadata can comprise additional code to add special instructions and/or it can comprise information such as the author or a description of the model. The metadata location and size can vary for the first machine learning model representation 120 and the second machine learning model representation 150.

The extracted model information 130, 160 can, at 170, be compared in order to determine whether some or all of the extracted model information matches which, in turn, indicates that the model representations 120, 150 reflect the same underlying machine learning model (but in different formats). The comparison can take an iterative approach in which, at first, the respective number of layers are compared. If there is a match, the identifiers of the respective layers to can be compared in order to determine whether they match. If there is a match of layer identifiers, then the weights for each corresponding layer can be compared to see if they match. If there is a match of layer weights, then the biases for each corresponding layer can be compared to see if they match. Match in this context, can refer to matching of the specific weights or biases. Matching in this context, can include 1:1 matching, matching above a pre-defined threshold (e.g., 99% match, etc.) and/or fuzzy matching (using one or more fuzzy matching or other similarity analysis algorithms). With regard to the latter, the "fuzz" of the match is that it each individual weight/bias entry needs to be compared—but does not need to be strictly *equal*. Similar to how comparing a value in Float32 would be different than the same value in Float64: e.g., the Float64 value of 0.12345678912121212 when cast to Float32 is 0.12345679—so the same number has a difference of 0.000,000,000,878,788 (not equal in computing terms). The determination of whether or not the model representations 120, 150 can be provided, at 180, to a consuming application or process. The consuming application or process can, for example, transmit data characterizing the determination to a remote computing system over a network, store data characterizing the determination locally in physical persistence, load data characterizing the determination in memory, and/or cause data characterizing the determination to be visualized in a graphical user interface.

The comparison techniques provided herein can be used in by the consuming application or process in connection with a third-party conversion service, such as the Hugging-Face Safetensors conversion service, to verify that a converted machine learning model is the same as an uploaded version of such machine learning model. This arrangement ensures data integrity when relying on a third party.

The comparison techniques provided herein can additionally or alternatively be used by the consuming application or process when downloading a newer file format model for the same model. The use case here would be that one can ensure that the model is the same and no processes or other aspects relying on the weights will break as part of the upgrade. An example of this is conversion from GGML to GGUF.

The comparison techniques provided herein can be used by the consuming application or process to detect if a model that is being shared on open-source hubs in one format is actually another model which may be proprietary. In this use case, the model can be compared to see if the model has been stolen and is being shared without rights from the owner or has been faithfully converted.

Different workflows can be implemented depending on the system or environment configuration. For example, one or more of the first machine learning model representation 120 and the second machine learning model representation 150 can be obtained from a data source other than a repository such as local storage or a defined computing environment.

Figure 2:
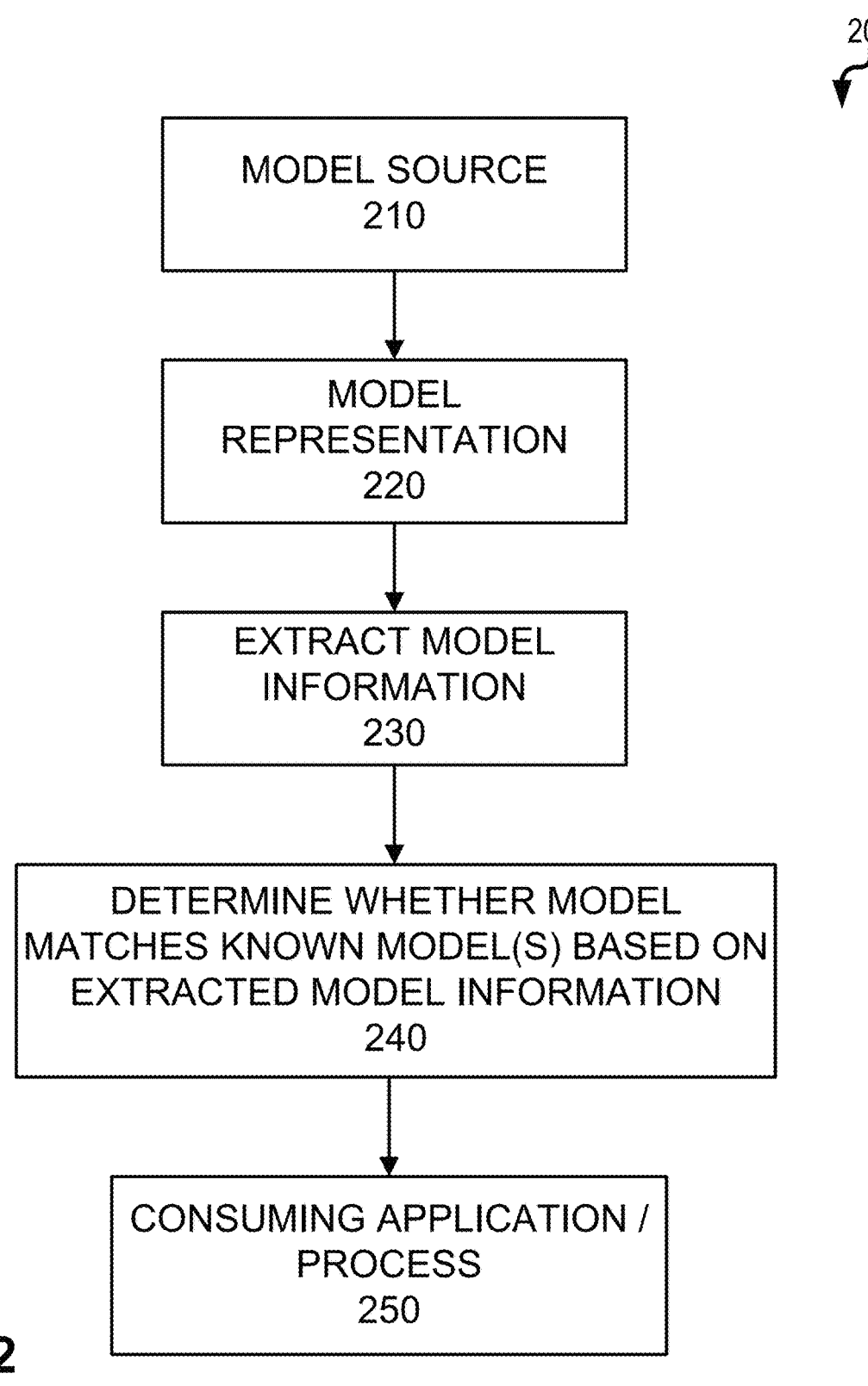
FIG. 2 is a process flow diagram illustrating a second cross-model comparison workflow.

FIG. 2 is a sample workflow 200 in which a model representation 220 is obtained from a model source 210. As mentioned above, the model source 210 can take varying forms including local storage, a dedicated computing environment, a model repository (e.g., website storing thousands of open source/publicly available models, etc.). Information characterizing the model representation 220 can be extracted to result in extracted model information 230. This extracted model information 230 can be compared, at 240, to information characterizing one or more known (i.e., previously characterized) machine learning models in order to determine whether there is a match using techniques (e.g., layer number, layer identifier, weights, and bias comparisons, etc.) such as those described above. A match can, in some cases, be used to determine an identity of the underlying machine learning model for the model representation 220. Information regarding the comparison (i.e., the model matching determination) can be provided, at 250, to a consuming application or process.

In some cases, different pre-processing techniques can be employed to increase the computational efficiency of the matching comparisons. For example, in some cases, the layer identifiers and/or the weight values can be re-ordered (e.g., in a deterministic manner such as by sorting, etc.).

In some variations, the particular machine learning model format might not include identifiers in the corresponding model representations; however, the particular model format might be known and such model formats may have known layer sequences (even if they are not specifically identified). This mapping information can be used to determine which layers from the respective extracted model information 120, 150

All models must map their data-types such that they can be interpreted when being read from file. As such, changes in precision (and "holes" in floating point) for each representation can be different. Given that the formats are either declared or known a priori, a mapping can be established to guide comparisons—i.e., to define "equality" between any two types. For example, single and double precision (32 & 64 bit float) value of x (3.14159265358979323846264338327950288 4197) are stored as 3.1415927410125732421875, and 3.141592653589793115997963468544185161590576171875 respectively. Note that the values deviate well before the precision of each number is exhausted—though they within 99.999997% of each other. In such a case, the current subject matter can consider each of these equivalent (i.e., matching, etc.)—even though they are not mathematically identical.

Figure 3:
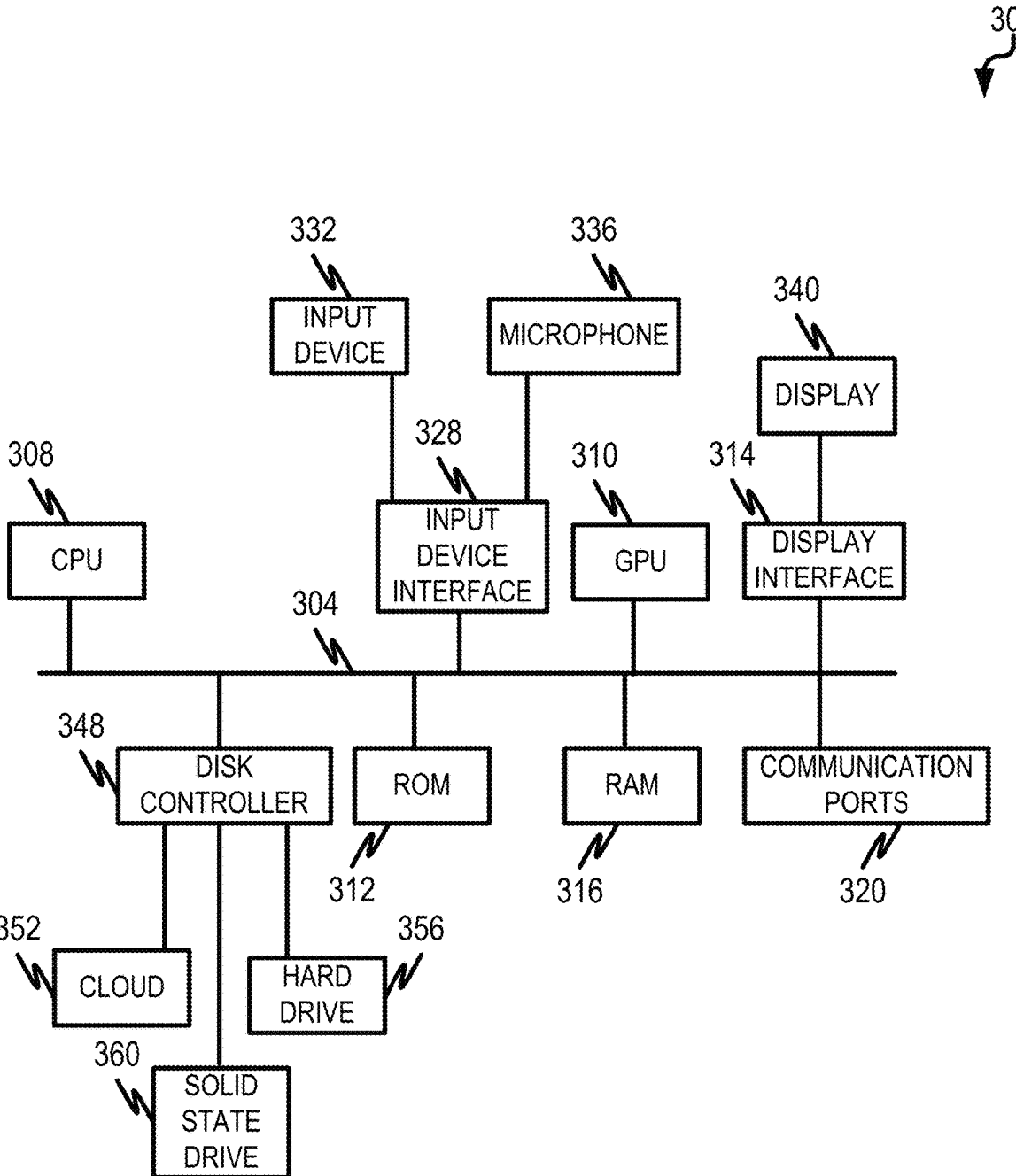
FIG. 3 is a system diagram illustrating a computing device which can be used to implement aspects of a cross-model comparison workflow.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. In addition, a processing system 310 labeled GPU (graphics processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal such as cloud drive 352, a solid state drives 360 and/or external or internal hard drives 356. As indicated previously, these various disk drives 352, 356, 360 and disk controllers are optional devices. The system bus 304 can also include at least one communication port 320 to allow for communication with external devices (e.g., cloud services, etc.) either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a touchscreen, LED, LCD, etc.) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for confirming an identity of a machine learning model, the method being implemented by at least one computing device and comprising:

accessing a first cloud-based machine learning model repository to obtain first data characterizing a first machine learning model;

extracting first information characterizing weight layers from the first machine learning model including a number of layers and identifiers of such layers;

accessing a second cloud-based machine learning model repository to obtain second data characterizing a second machine learning model, the second machine learning model being known to operate in a desired manner;

extracting second information characterizing weight layers from the second machine learning model a number of layers and identifiers of such layers;

determining, by comparing the extracted first information to the extracted second information, whether the first machine learning model is a same model as the second machine learning model if the respective number of layers and the identifiers of the layers match; and providing data indicating whether the models store a same or different model to a consuming application or process.

2. The method of claim 1, wherein a format of the first machine learning model is different than a format of the second machine learning model.

3. The method of claim 1, wherein a format of the first machine learning model and a format of the second machine learning model are the same.

4. The method of claim 1 further comprising:

detecting a format of the first machine learning model;

specifying, based on the format of the first learning model, which features to extract from the first data to constitute the extracted first information.

5. The method of claim 4 further comprising:

detecting a format of the second machine learning model;

specifying, based on the format of the second learning model, which features to extract from the second data to constitute the extracted second information.

6. The method of claim 1, wherein:

the extracted first information further comprises weights for each of the layers of the first machine learning model;

the extracted second information further comprises weights for each of the layers of the second machine learning model;

the determination further comprises:

comparing the weights for layers having a same identifier to determine whether they match.

7. The method of claim 4 further comprising:

reordering the weights in a deterministic prior to the comparing.

8. The method of claim 6, wherein:

the extracted first information further comprises biases for each of the layers of the first machine learning model;

the extracted second information further comprises biases for each of the layers of the second machine learning model;

the determination further comprises:

comparing the biases for layers having a same identifier to determine whether they match.

9. The method of claim 1 further comprising:

determining a format for the first machine learning model, wherein the extracted first information is based on the determined format for the first machine learning model; and determining a format for the second machine learning model, wherein the extracted second information is based on the determined format for the second machine learning model.

10. The method of claim 1, wherein the first data comprises a first file and the second data comprises a second file, wherein metadata in the first file is different than metadata in the second file.

11. A method for confirming an identity of a machine learning model, the method being implemented by at least one computing device and comprising:

accessing a first cloud-based model repository to obtain first data characterizing a first machine learning model;

extracting first information characterizing weight layers from the first machine learning model including a number of layers, identifiers of the layers, weight values for the layers, and bias values for the layers;

accessing a second cloud-based model repository to obtain a second machine learning model which is of a different format and/or has different metadata than the first machine learning model, the second machine learning model being known to operate in a desired manner;

extracting second information characterizing weight layers from the second machine learning model including a number of layers, identifiers of the layers, weight values for the layers, and bias values for the layers;

first comparing the number of layers from the extracted first information to the number of layers from the extracted second information to detect a match;

second comparing, if a match is detected in the first comparing, the identifiers of the layers from the extracted first information to the identifiers from the extracted second information to detect a match;

third comparing, if a match is detected in the second comparing, the weight values from the extracted first information to the weight values from the extracted second information to detect a match;

fourth comparing, if a match is detected in the third comparing, the bias values from the extracted first information to the bias values from the extracted second information to detect a match;

determining that the first machine learning model is a same model as the second machine learning model if each of the first comparing, the second comparing, the third comparing, and fourth comparing detect a match;

determining that the first machine learning model does not store a same model as the second machine learning model if one of the first comparing, the second comparing, the third comparing, and the fourth comparing do not detect a match; and providing data indicating whether the first machine learning model and the second machine learning model are the same or different to a consuming application or process.

12. The method of claim 11, wherein the first comparing, the second comparing, the third comparing, and the fourth comparing are sequentially performed on a layer-by-layer basis until the earlier of (i) all layers being analyzed or (ii) a match is not detected for one of the layers.

13. The method of claim 11, wherein the first data comprises a first file having a first format and the second data comprises a second file having a second format.

14. The method of claim 13, wherein the first format is different than the second format.

15. The method of claim 13, wherein the first format and the second format are the same.

16. A method for confirming an identity of a machine learning model, the method being implemented by at least one computing device and comprising:

accessing a cloud-based repository to obtain first data characterizing a first machine learning model;

extracting first information characterizing weight layers from the first machine learning model including a number of layers and identifiers of such layers;

determining, by comparing the extracted first information to extracted second information associated with a second machine learning model, whether the first machine learning model stores a same model as the second machine learning model, the extracted second information characterizing weight layers from the second machine learning model including a number of layers and identifiers of such layers, the determining being based on whether the respective number of layers and the identifiers of the layers from the extracted first information match and the extracted second information, the second machine learning model being known to operate in a desired manner; and providing data indicating whether the models store a same or different model to a consuming application or process.

17. The method of claim 16, wherein:

the extracted first information further comprises weights of each layer for the first machine learning model;

the extracted second information further comprises weights for each layer of the second machine learning model; and wherein the determining is further based on whether the weights for each layer in the extract first information and the extracted second information match.

18. The method of claim 17, wherein:

the extracted first information further comprises biases of each layer for the first machine learning model;

the extracted second information further comprises biases for each layer of the second machine learning model; and wherein the determining is further based on whether the biases for each layer in the extract first information and the extracted second information match.

19. The method of claim 18, wherein the determining is performed on a layer-by-layer basis until all layers have been analyzed or a determination is made that one of the layers in the extracted first information does not match a corresponding layer in the extracted second information.

20. The method of claim 19 further comprising:

receiving second data characterizing the second machine learning model; and extracting the second information from the second data.

21. The method of claim 20, wherein the first data comprises a first file and the second data comprises a second file.

22. The method of claim 21, wherein a format of the first file is different than a format of the second file.

23. The method of claim 21, wherein a format of the first file and a format of the second file are the same.

24. The method of claim 1 further comprising:

verifying, by the consuming application or process, that the first machine learning model after conversion is same as an uploaded version of the second machine learning model.

25. The method of claim 1 further comprising:

determining, by the consuming application or process, that the first machine learning model is a shared version of the second machine learning model which has been shared without rights from an owner of the second machine learning model.

* * * * *